United States Patent [19]
Chiyoda et al.

[11] Patent Number: 6,063,265
[45] Date of Patent: May 16, 2000

[54] PROCESS FOR PRODUCING HYDRODESULFURIZATION CATALYST AND HYDRODESULFURIZING GAS OIL THEREWITH

[75] Inventors: Osamu Chiyoda; Kazushi Usui; Mitsugu Yumoto; Kazuo Idei; Etsuo Suzuki; Katsuyoshi Ohki; Takashi Fujikawa; Hatsutaro Yamazaki; Shunji Kitada, all of Saitama, Japan

[73] Assignees: Cosmo Oil Co., Ltd.; Petpoleum Energy Center, both of Tokyo, Japan

[21] Appl. No.: 08/851,927

[22] Filed: May 6, 1997

Related U.S. Application Data

[60] Continuation of application No. 08/465,514, Jun. 5, 1995, abandoned, which is a division of application No. 08/366,116, Dec. 29, 1994, abandoned.

[51] Int. Cl.$^7$ ..................................................... C10G 45/04
[52] U.S. Cl. ............................... 208/216 R; 208/216 PP; 208/217
[58] Field of Search ....................... 208/216 R, 216 PP, 208/217

[56] References Cited

U.S. PATENT DOCUMENTS

| | | | |
|---|---|---|---|
| 4,028,227 | 6/1977 | Gustafson | 208/216 |
| 4,089,775 | 5/1978 | Berger et al. | 208/111 |
| 4,133,744 | 1/1979 | Mitchell et al. | 208/213 |
| 4,500,424 | 2/1985 | Simpson | 208/216 R |
| 4,585,748 | 4/1986 | Usi et al. | 502/66 |
| 4,988,654 | 1/1991 | Kennedy | 502/84 |
| 5,112,473 | 5/1992 | Dai et al. | 208/120 |
| 5,338,717 | 8/1994 | Aldridge et al. | 502/211 |

FOREIGN PATENT DOCUMENTS 0556108  8/1993  European Pat. Off. .

OTHER PUBLICATIONS

Patent Abstracts of Japan, Abstract of JP-A-4-187649 Jun. 1992.

Patent Abstracts of Japan, Abstract of JP-A-62-197150 Aug. 1987.

*Primary Examiner*—Helane Myers
*Attorney, Agent, or Firm*—Sughrue, Mion, Zinn Macpeak & Seas, PLLC

[57] ABSTRACT

A process for producing a hydrodesulfurization catalyst is disclosed, comprising impregnating an inorganic oxide carrier containing a crystalline aluminosilicate with a solution consisting of Group VI metal oxide, a Group VIII metal oxide, and phosphorus. Also disclosed is a process for deep hydrodesulfurization of a gas oil fraction using said catalyst to obtain gas oil having an extremely low sulfur content.

24 Claims, No Drawings

PROCESS FOR PRODUCING HYDRODESULFURIZATION CATALYST AND HYDRODESULFURIZING GAS OIL THEREWITH

This is a Continuation of application Ser. No. 08/465,514 now ABN filed Jun. 5, 1995, which is a divisional of application Ser. No. 08/366,116 filed Dec. 29, 1994, now ABN.

FIELD OF THE INVENTION

This invention relates to a process for producing a catalyst for hydrodesulfurization of hydrocarbon oils and a deep desulfurization process of gas oil using the catalyst. More particularly, it relates to a process for producing a catalyst for hydrodesulfurization, which catalyst contains large amounts of a Group VI metal, a Group VIII metal and phosphorus.

BACKGROUND OF THE INVENTION

Hydrocarbon oils generally contain sulfur compounds. When a hydrocarbon oil is used as a fuel, sulfur in the sulfur compounds is converted to sulfur oxides, which are discharged into the atmosphere. In order to reduce air pollution caused by combustion of a hydrocarbon oil, it is desirable to reduce the sulfur content of a hydrocarbon oil to as low a level as possible. This can be achieved by subjecting the hydrocarbon oil to a catalytic hydrodesulfurization process (HDP).

Catalysts conventionally used for HDP comprise an oxide carrier, such as alumina, magnesia or silica, having supported thereon a metal belonging to Group VI of the Periodic Table (hereinafter simply referred to as a Group VI metal) and a metal belonging to Group VIII of the Periodic Table (hereinafter simply referred to as a Group VIII metal) as active metals. Mo or W is normally used as the Group VI metal, and Co or Ni is normally used as the Group VIII metal.

Addition of phosphorus, boron, etc., to the catalyst has been proposed for improvement of catalytic activity as disclosed in JP-A-52-13503 (the term "JP-A" as used herein means an "unexamined published Japanese patent application). On the other hand, incorporation of a crystalline aluminosilicate into an inorganic oxide carrier is disclosed in JP-A-56-20087. A combination of these techniques is also disclosed in JP-A-61-126196 and JP-A-2-214544.

Conventional methods for incorporating the above-mentioned active metal into a carrier include a so-called impregnation process using an aqueous impregnating solution of a salt of the metal, such as an ammonium salt or a nitrate. Where phosphorus is also to be supported, however, it has been difficult to prepare a catalyst having high contents of a Group VI metal and phosphorus through one-step impregnation on account of the relatively low solubility of a Group VI metal salt into a phosphoric acid solution. Therefore, the impregnation had to be performed in two steps; a carrier is impregnated first with phosphorus and then with a Group VI metal. Otherwise, the amount of the Group VI metal to be supported had to be reduced to an undesirable level.

As restrictions on the sulfur content in gas oil products available on the market have been increased for environmental conservation (e.g., the upper limit of 0.5% by weight was lowered to 0.05% by weight), deeper desulfurization is becoming mandatory, and it has been demanded to establish a technique for removing sulfur-containing compounds which are hardly desulfurized (hereinafter referred to as intractable substances), such as 4-methyldibenzothiophene (4M-DBT) and 4,6-dimethyldibenzothiophene (4,6DM-DBT).

Under these circumstances, JP-A-4-265158 discloses a process for obtaining a catalyst containing more than 20% by weight of a Group VI metal in combination with phosphorus through a single impregnation step. However, the process disclosed needs a considerably high temperature and a long time for preparing an impregnating solution, which has disadvantages for mass production.

The above-mentioned incorporation of crystalline aluminosilicate into an inorganic oxide carrier is aimed at obtaining light oil by cracking of heavy oil and has not been employed for deep desulfurization of a light oil fraction.

SUMMARY OF THE INVENTION

An object of the present invention is to provide a process for producing a catalyst exhibiting excellent hydrodesulfurization activity in deep desulfurization of gas oil.

Another object of the present invention is to provide a process for producing a catalyst for hydrodesulfurization in which a carrier can be impregnated with a Group VI metal, a Group VIII metal, and phosphorus at one time to high contents at a low temperature in a short time.

A further object of the present invention is to provide a process for deep hydrodesulfurization of gas oil in which intractable substances can effectively be removed to provide gas oil having an extremely low sulfur content.

The present invention relates to a process for producing a catalyst for hydrodesulfurization of hydrocarbon oils comprising impregnating an inorganic oxide carrier containing a crystalline aluminosilicate with a solution having dissolved therein a polyacid salt of a Group VI metal, a salt of a Group VIII metal, and phosphoric acid to provide a Group VI metal content of from 10 to 30% by weight, from 1 to 15% by weight of a Group VIII metal, and from 0.1 to 15% by weight of phosphorus, each in terms of oxide with respect to the total catalyst.

The present invention also relates to a process for hydrodesulfurizing gas oil, comprising bringing at least one feedstock selected from gas oil obtained by catalytic cracking, gas oil obtained by thermal cracking, straight-run gas oil, coker gas oil, gas oil having been subjected to a hydrogenation treatment, and gas oil having been subjected to a desulfurization treatment into contact with a catalyst composed of a carrier comprising from 80 to 99% by weight of an inorganic oxide and from 1 to 20% by weight of a zeolite having a unit cell dimension between 24.45 Å and 24.55 Å, the carrier having supported thereon (1) from 10 to 30% by weight, in terms of oxide, of a Group VI metal, (2) from 1 to 15% by weight, in terms of oxide, of a Group VIII metal, and (3) from 0.1 to 15% by weight, in terms of oxide, of phosphorus and having a mean pore diameter of from 70 to 80 Å with a pore size distribution (a proportion of pores having a pore size of the mean pore diameter ±15 Å) of not less than 70%, under conditions of from 30 to 80 kg/cm$^2$ in hydrogen partial pressure, from 320 to 380° C. in temperature and from 1.0 to 5.0 hr$^{-1}$ in liquid hourly space velocity.

DETAILED DESCRIPTION OF THE INVENTION

The carrier which can be used in the present invention is an inorganic oxide containing a crystalline aluminosilicate.

Suitable inorganic oxides include silica, alumina, boria, magnesia, titania, silica-alumina, silica-magnesia, silicazirconia, silica-thoria, silica-beryllia, silica-titania, silica-boria, alumina-zirconia, alumina-titania, alumina-boria, alumina-chromia, titania-zirconia, silica-alumina-thoria, silica-alumina-zirconia, silica-alumina-magnesia, and silica-magnesia-zirconia, with alumina, silica-alumina, alumina-titania, alumina-boria, and alumina-zirconia being preferred. Alumina is preferably γ-alumina. These inorganic oxides can be used either individually or in combination of two or more thereof.

The crystalline aluminosilicate having a unit cell dimension between 24.45 Å and 24.55 Å which is incorporated into the inorganic oxide includes A type zeolite, X type zeolite, Y type zeolite, stabilized Y type zeolite, superstabilized Y type zeolite, HY type zeolite, L type zeolite, and ZSM type zeolite, with HY type zeolite and stabilized Y type zeolite being preferred. These crystalline aluminosilicates can be used either individually or in combination of two or more thereof.

Zeolite whose unit cell dimension is less than 24.45 Å, although having a high total amount of acidic sites, exhibits insufficient acid strength for removing intractable substances at commonly employed desulfurization temperatures. On the other hand, zeolite whose unit cell dimension exceeds 24.55 Å has an insufficient total amount of acidic sites, only exhibiting low activity as a whole.

The carrier consists of 80 to 99% by weight, preferably 85 to 98% by weight, of an inorganic oxide and 1 to 20% by weight, preferably 2 to 15% by weight, of zeolite. If the proportion of the inorganic oxide in the carrier is less than 80% by weight, the surface area of the catalyst is insufficient. Besides, zeolite, if present in a proportion of more than 20% by weight, deteriorates the degree of dispersion in respect of active metal components. If the proportion of the inorganic oxide exceeds 99% by weight, i.e., if the proportion of zeolite is less than 1% by weight, there is no technical significance of incorporating zeolite.

If desired, the carrier may further contain one or more of clay minerals, such as montmorillonite, kaolin, halloysite, bentonite, attapulgite, bauxite, kaolinite, nacrite, and anorthite.

While not limiting, the carrier preferably has a specific surface area of not less than 250 m$^2$/g (measured by a BET method) for accomplishing the objects of the present invention, i.e., to impregnate a carrier with a Group VI metal, a Group VIII metal, and phosphorus to high contents at a low temperature in a short time to provide a catalyst exhibiting excellent hydrodesulfurization activity in deep desulfurization. For the same reason, the carrier, while not limiting, preferably has a pore volume between 0.3 cc/g and 1.2 cc/g and a mean pore diameter between 50 Å and 130 Å.

Inorganic polyacid salts of Group VI metals which can be supported on the above-mentioned carrier preferably include those of chromium, molybdenum or tungsten, still more preferably heteropoly-acid salts of molybdenum or tungsten.

Examples of useful inorganic heteropoly-acids are phosphomolybdic acid [$H_3(PMo_{12}O_{40}).30H_2O$], silicomolybdic acid [$H_3(SiMo_{12}O_{40}).30H_2O$], phosphotungstic acid [$H_3(PW_{12}O_{40}).30H_2O$], and silicotungstic acid [$H_3(SiW_{12}O_{40}).30H_2O$]. Preferred of them are phosphomolybdic acid and silicomolybdic acid, with phosphomolybdic acid being still preferred. These polyacid salts can be used either individually or in combination of two or more thereof.

The Group VIII metal salts which can be supported on the carrier together with the above-mentioned Group VI metal polyacid salt include salts of iron, cobalt, nickel, rhodium, palladium, osmium, iridium or platinum, with a carbonate, an acetate or a phosphate of cobalt or nickel being preferred. These metal salts can be used either individually or in combination of two or more thereof.

The phosphoric acid which can be supported on the carrier together with the Group VI metal polyacid salt and the Group VIII metal salt includes orthophosphoric acid, metaphosphoric acid, pyrrophosphoric acid, triphosphoric acid, tetraphosphoric acid, and polyphosphoric acid, with orthophosphoric acid being preferred.

The above-mentioned Group VI metal component, Group VIII metal component, and phosphorus (hereinafter inclusively referred to as catalyst components) are incorporated into the aforesaid carrier in a conventional manner. Known techniques for incorporating catalyst components into a carrier which may be applied to the production of the catalyst of the present invention include impregnation comprising impregnating a carrier with an impregnating solution having dissolved therein the catalyst component; spraying consisting of spraying the impregnating solution onto the carrier; chemical vapor deposition consisting of chemically depositing the catalyst components on the carrier; a so-called kneading process in which the above-described carrier components are kneaded with a part or the whole of the catalyst components and then molded into a carrier; a so-called coprecipitation process; and a so-called alkoxide process.

The solvent for dissolving the catalyst components to prepare an impregnating solution which can be used in the above-mentioned impregnation process is not particularly limited and includes, for example, water, alcohols, ethers, ketones, and aromatic solvents. Examples of suitable solvents are water, acetone, methanol, n-propyl alcohol, isopropyl alcohol, n-butanol, isobutyl alcohol, hexanol, benzene, toluene, xylene, diethyl ether, tetrahydrofuran, and dioxane. Preferred of them is water.

The proportions of the catalyst components in the impregnating solution are usually selected so that the catalyst after calcination may contain from 10 to 30% by weight, preferably from 18 to 25% by weight, in terms of oxide, of the Group VI metal and from 1 to 15% by weight, preferably from 3 to 7% by weight, in terms of oxide, of the Group VIII metal with respect to the total catalyst.

If the amount of the Group VI metal polyacid salt in the solution is less than which would provide 10% by weight of the Group VI metal oxide in the catalyst, the Group VIII metal salt tends to become hard to dissolve in the solution. If the content of the Group VI metal in the catalyst exceeds 30% by weight in terms of oxide, the surface area of the catalyst tends to be decreased to reduce the catalytic activity.

If the content of the Group VIII metal salt in the catalyst is less than 1% by weight in terms of oxide, sufficient catalytic activity cannot be obtained. If it exceeds 15% by weight, the oxide of the metal is apt to cover the whole surface of the catalyst to reduce the catalytic activity.

The proportion of phosphoric acid in the solution is selected so that the catalyst after calcination may have a phosphorus content of from 0.1 to 15% by weight, preferably from 1 to 7% by weight, in terms of oxide. If the proportion of phosphoric acid is too low, no significant technical effect is produced by addition of phosphoric acid. If it is too high, there is a tendency that the resulting catalyst has a reduced pore volume, leading to a reduction in catalytic activity.

The solvent is normally used in an amount of from 50 to 150 g, preferably from 70 to 90 g, per 100 g of the carrier. Too small an amount of the solvent fails to be sufficiently infiltrated into the carrier. If the amount of the solvent is too large, the dissolved active metal components cannot be infiltrated into the carrier, rather adhering to the inner wall of an impregnating container, failing to assure desired contents of the catalyst components.

An impregnation solution can be prepared by dissolving the catalyst components at a temperature higher than 0° C. and lower than 100° C. Within this temperature range, the catalyst components can satisfactorily be dissolved in the solvent.

The thus prepared impregnating solution is infiltrated into the carrier to support the catalyst components in the solution on the carrier through one impregnation step, and the impregnated carrier is dried and calcined to obtain the catalyst to be used in the present invention.

If desired, impregnation of the three catalyst components may be carried out through two divided stages. In this case, the impregnated carrier may be dried and calcined between two impregnation stages. For example, in a preferred embodiment of impregnation, the catalyst of the present invention can be prepared by impregnating the carrier first with an impregnating solution containing the Group VI metal polyacid salt and phosphoric acid to support 10 to 30% by weight of the Group VI metal and 0.1 to 15% by weight of phosphorus each in terms of oxide based on the catalyst, drying, calcining, then impregnating the calcined carrier with a second impregnating solution containing the Group VIII metal salt to support 1 to 15% by weight, in terms of oxide, of the Group VIII metal based on the catalyst, followed by drying and calcining.

Impregnation can be carried out under various conditions, usually at a temperature higher than 0° C. and lower than 100° C., preferably from 10 to 50° C., still preferably from 15 to 30° C., for a period of from 15 minutes to 3 hours, preferably from 20 minutes to 2 hours, still preferably from 30 minutes to 1 hour. At too high an impregnating temperature, the solution undergoes drying during impregnation, resulting in localization of the catalyst components. It is preferable to agitate the solution and carrier during impregnation.

Drying of the impregnated carrier can be performed by various drying methods, such as air drying, hot air drying, heat drying, and freeze-drying.

Calcination can be conducted by means of various furnaces, such as an electric oven, a muffle furnace, an alundum bath, and an electric tubular furnace. It is usually preferable to carry out calcination in an electric oven under aeration or in a muffle oven.

The calcining temperature is selected appropriately according to the calcination method used. For example, calcination in an electric oven under aeration or in a muffle oven is effected at 200 to 800° C., preferably 300 to 700° C., still preferably 450 to 650° C. If the calcining temperature is too low, the active metal components cannot be supported sufficiently, and catalyst poison remains. If it is too high, the catalyst undergoes sintering. The calcination time is preferably 2 to 10 hours, still more preferably 3 to 5 hours.

It is preferable, while not essential, for efficient removal even of intractable substances that the thus prepared catalyst of the present invention has a specific surface area of not less than 200 $m^2/g$ and a pore volume of from 0.3 to 1.2 cc/g.

Further, the catalyst suitably has a mean pore diameter of from 70 to 80 Å, preferably from 73 to 77 Å. A catalyst with too large a mean pore diameter facilitates diffusion of a reactant therethrough but has a reduced effective surface area, making it difficult to remove intractable substances. In the case of deep desulfurization, it is a practice often followed to conduct the reaction at a decreased liquid hourly space velocity so as to reduce the sulfur content to a prescribed level without deteriorating the color of the resulting gas oil. This being the case, the contact time would be extended so that there is no need any more to improve diffusion of a reactant by making the mean pore diameter larger. Moreover, no improvement in activity is observed with use of such a catalyst having a large mean pore diameter. On the other hand, a catalyst having too small a mean pore diameter encounters difficulty in production. For example, the physical properties essential for functioning as a catalyst (i.e., specific surface area and pore volume) could not be assured without involving the sacrifice of mechanical strength.

The pore size distribution is preferably 70% or more, still more preferably 80% or more, as expressed in terms of a proportion of those pores having a pore size of the mean pore diameter ±15 Å. If the pore size distribution is too small, i.e., showing a broad distribution curve, the number of the effective pores becomes relatively small even if the mean pore diameter is in an ideal range, failing to meet expectations.

The catalyst is not particularly limited in shape and may have any shape usually used in this kind of catalyst, for example, a cylindrical or four-leaf form. A suitable size of the catalyst is usually 1/10 to 1/22 in. in diameter and 3.2 to 3.6 in. in length.

The catalyst of the present invention may be used either alone or, if desired, as a mixture with a known catalyst or a known inorganic oxide carrier in the use thereof.

If desired, the catalyst of the present invention may further be formed in combination with one or more clay minerals, such as montmorillonite, kaolin, halloysite, bentonite, attapulgite, bauxite, kaolinite, nacrite, and anorthite.

Starting oils which can be hydrodesulfurized according to the present invention include gas oil obtained by catalytic cracking or thermal cracking, straight-run gas oil, coker gas oil, gas oil having been subjected to a hydrogenation treatment, and gas oil having been subjected to a desulfurization treatment. They may be used either individually or in combination of two or more thereof. Oils suitable to be treated have a boiling point ranging from 150 to 400° C., preferably from 200 to 380° C., still preferably from 220 to 340° C., and a sulfur content of not more than 3% by weight, preferably not more than 2.5% by weight, still preferably not more than 2.0% by weight.

The catalytic hydrodesulfurization reaction is usually carried out under a hydrogen partial pressure of from 30 to 80 $kg/cm^2$, preferably 50 to 60 $kg/cm^2$; at a temperature of from 320 to 380° C., preferably 320 to 360° C., more preferably 330 to 360° C.; at a liquid hourly space velocity (LHSV) of from 1.0 to 5.0 $hr^{-1}$, preferably 1.0 to 3.0 $hr^{-1}$, more preferably 1.0 to 2.0 $hr^{-1}$; and at a hydrogen/oil ratio of from 100 to 400 l/l, preferably 200 to 300 l/l.

Under a hydrogen pressure lower than 30 $kg/cm^2$, intractable substances could not be removed. If the hydrogen pressure exceeds 80 $kg/cm^2$, not only would the removal efficiency of intractable substances reach saturation but a pressure-resistant and expensive apparatus would be required to increase the cost.

If the reaction temperature is lower than 320° C., intractable substances cannot be removed. Even if it exceeds 380° C., the removal efficiency of intractable substances is saturated resulting in an uneconomical choice.

If the liquid hourly space velocity exceeds 5.0 hr$^{-1}$, the contact time between the catalyst and the oil is insufficient for removal of intractable substances. If it is less than 1.0 hr$^{-1}$, the contact time will be increased more than necessary, resulting in a reduction of feed capacity.

From the viewpoint of sulfur content of product oils, it is recommended to decide the reaction conditions so that the resulting product oil may have a sulfur content in the range of from 0.001 to 0.10% by weight, preferably from 0.005 to 0.05% by weight, still more preferably from 0.01 to 0.03% by weight. Under so selected reaction conditions, the working life of the catalyst according to the present invention is equal or even longer than that of typical conventional catalysts. In other words, it is possible to use the catalyst of the present invention in an industrial apparatus for at least one year.

In a process operated on a commercial scale, the catalyst is used in an appropriate reactor in the fixed bed, moving bed or fluidized bed form with respect to the catalyst particles, and the oil to be desulfurized is charged into the reactor and treated under predetermined conditions. In a general embodiment, the catalyst is maintained in the fixed bed form and the oil is allowed to pass therethrough downward. The catalyst may be used in a single reactor, or may be distributed in two or more reactors connected in series.

The present invention will now be illustrated in greater detail by referring to the following Examples, but it should be understood that the present invention is not to be construed as being limited thereto. All the percents are by weight unless otherwise indicated.

EXAMPLE 1

An impregnating aqueous solution was prepared by dissolving 11 g of cobalt carbonate, 4 g of phosphoric acid, and 38 g of phosphomolybdic acid [$H_3(PMo_{12}O_{40}) \cdot 30H_2O$] in 75 g of water with stirring in an Erlenmeyer flask at room temperature. The aqueous solution was infiltrated into 100 g of an alumina carrier containing 5% of HY type zeolite (specific surface area: 372 m$^2$/g; pore volume: 0.65 cc/g; substantially made of γ-alumina) in an egg-plant type flask at room temperature for 1 hour. The impregnated carrier was air dried and calcined at 500° C. for 4 hours in a muffle furnace to obtain a catalyst (hereinafter designated catalyst A).

EXAMPLE 2

Catalyst B was prepared in the same manner as in Example 1, except for replacing 11 g of cobalt carbonate with 11 g of nickel carbonate.

EXAMPLE 3

Catalyst C was prepared in the same manner as in Example 1, except for replacing 38 g of phosphomolybdic acid with 36 g of phosphotungstic acid [$H_3(PW_{12}O_{40}) \cdot 30H_2O$].

EXAMPLE 4

Catalyst D was prepared in the same manner as in Example 1, except for changing the amount of phosphomolybdic acid to 28.5 g.

EXAMPLE 5

Catalyst E was prepared in the same manner as in Example 1, except for changing the amount of phosphomolybdic acid to 47.5 g.

EXAMPLE 6

Catalyst F was prepared in the same manner as in Example 1, except for changing the amount of phosphoric acid to 6.2 g.

EXAMPLE 7

Catalyst G was prepared in the same manner as in Example 1, except for changing the HY type zeolite content in the alumina carrier to 10%.

EXAMPLE 8

Catalyst H was prepared in the same manner as in Example 1, except for changing the HY type zeolite content in the alumina carrier to 20%.

EXAMPLE 9

Catalyst I was prepared in the same manner as in Example 3, except for replacing 11 g of cobalt carbonate with 11 g of nickel carbonate.

EXAMPLE 10

Catalyst J was prepared in the same manner as in Example 1, except for changing the amount of cobalt carbonate to 15.4 g.

EXAMPLE 11

Catalyst K was prepared in the same manner as in Example 1, except for changing the amount of cobalt carbonate to 8.8 g.

EXAMPLE 12

Catalyst L was prepared in the same manner as in Example 1, except for replacing 11 g of cobalt carbonate with 21.6 g of cobalt acetate.

COMPARATIVE EXAMPLE 1

In an Erlenmeyer flask, 32.7 g of ammonium molybdate was dissolved in 75 g of water at room temperature. Aqueous ammonia was added thereto with stirring until the ammonium molybdate was completely dissolved to prepare a first impregnating solution. The aqueous solution was infiltrated into 100 g of a γ-alumina carrier having a specific surface area of 336 m$^2$/g, a pore volume of 0.71 cc/g, and a mean pore diameter of 85 Å in an egg-plant type flask at room temperature for 1 hour. The impregnated carrier was air dried and calcined at 500° C. for 4 hours in a muffle furnace.

Separately, 26 g of cobalt nitrate was dissolved in 70 g of water with stirring at room temperature in an Erlenmeyer flask to prepare a second impregnating solution. The above obtained catalyst was impregnated with the second impregnating solution at room temperature for 1 hour in an egg-plant type flask, dried, and calcined in the same manner as described above to obtain catalyst M.

COMPARATIVE EXAMPLE 2

Catalyst N was prepared in the same manner as in Example 1, except for using the same γ-alumina as used in Comparative Example 1 as a carrier.

COMPARATIVE EXAMPLE 3

Catalyst O was prepared in the same manner as in Comparative Example 1, except for using the same HY type zeolite-containing alumina as used in Example 1 as a carrier.

COMPARATIVE EXAMPLE 4

Catalyst P was prepared in the same manner as in Example 1, except for changing the amount of phosphomolybdic acid to 15.2 g.

COMPARATIVE EXAMPLE 5

Catalyst Q was prepared in the same manner as in Example 1, except for changing the amount of phosphoric acid to 19.4 g.

COMPARATIVE EXAMPLE 6

In an Erlenmeyer flask, 4.2 g of phosphoric acid was dissolved in 75 g of water with stirring at room temperature to prepare a first impregnating solution. The first impregnating solution was infiltrated into 100 g of the same carrier as used in Example 1 in an egg-plant type flask at room temperature for 1 hour. The impregnated carrier was air dried and calcined at 500° C. for 4 hours in a muffle furnace.

Separately, 32.7 g of ammonium molybdate was dissolved in 65 g of water with stirring at room temperature in an Erlenmeyer flask to prepare a second impregnating solution. The above obtained catalyst was impregnated with the second impregnating solution at room temperature for 1 hour in an egg-plant type flask, dried, and calcined in the same manner as described above.

A third impregnating solution was prepared by dissolving 26 g of cobalt nitrate in 60 g of water in an Erlenmeyer flask at room temperature while stirring. The above prepared catalyst was impregnated with the third impregnating solution at room temperature in an egg-plant type flask, dried, and calcined in the same manner as described above to obtain catalyst R.

COMPARATIVE EXAMPLE 7

In an Erlenmeyer flask, 32.7 g of ammonium molybdate was dissolved in 75 g of water at room temperature while stirring to prepare a first impregnating solution. The first impregnating solution was infiltrated into 100 g of the same carrier as used in Example 1 at room temperature for 1 hour in an egg-plant type flask. The impregnated carrier was air dried and calcined at 500° C. for 4 hours in a muffle furnace.

Separately, 4.2 g of phosphoric acid and 26 g of cobalt nitrate were dissolved in 70 g of water with stirring at room temperature in an Erlenmeyer flask to prepare a second impregnating solution. The above obtained catalyst was impregnated with the second impregnating solution at room temperature in an egg-plant type flask, dried, and calcined in the same manner as described above to obtain catalyst S.

COMPARATIVE EXAMPLE 8

In an Erlenmeyer flask, 32.7 g of ammonium molybdate, 26 g of cobalt nitrate, and 4.2 g of phosphoric acid were stirred in 75 g of water at room temperature in an attempt to prepare an impregnating solution that would provide 3.0% of CoO, 20.0% of $MoO_3$ and 3.0% of $P_2O_5$ in the whole composition of a calcined catalyst. However, insoluble matter remained in the solution; therefore the solution was unsuitable as an impregnating solution. It is thus seen that use of a compound of a Group VI metal like ammonium molybdate, that has typically been employed, fails to provide a desired phosphorus content and a desired Group VI metal content.

The composition and properties of catalysts A to S obtained in Examples 1 to 12 and Comparative Examples 1 to 7 and catalyst A1 prepared in Example 14 hereinafter described are shown in Tables 1 and 2, respectively.

TABLE 1

| Example No. | Group VIII | | Group VI | | $P_2O_5$ (wt %) | Zeolite (wt %) | Catalyst |
|---|---|---|---|---|---|---|---|
| | Metal | Oxide Amount (wt %) | Metal | Oxide Amount (wt %) | | | |
| Example | | | | | | | |
| 1 | CoO | 5 | $MoO_3$ | 20 | 3 | 5 | A |
| 2 | NiO | 5 | $MoO_3$ | 20 | 3 | 5 | B |
| 3 | CoO | 5 | $WO_3$ | 20 | 3 | 5 | C |
| 4 | CoO | 5 | $MoO_3$ | 15 | 3 | 5 | D |
| 5 | CoO | 5 | $MoO_3$ | 25 | 3 | 5 | E |
| 6 | CoO | 5 | $MoO_3$ | 20 | 5 | 5 | F |
| 7 | CoO | 5 | $MoO_3$ | 20 | 5 | 10 | G |
| 8 | CoO | 5 | $MoO_3$ | 20 | 5 | 20 | H |
| 9 | NiO | 5 | $WO_3$ | 20 | 3 | 5 | I |
| 10 | CoO | 7 | $MoO_3$ | 20 | 3 | 5 | J |
| 11 | CoO | 3 | $MoO_3$ | 20 | 3 | 5 | K |
| 12 | CoO | 5 | $MoO_3$ | 20 | 3 | 5 | L |
| Compara. Example | | | | | | | |
| 1 | CoO | 5 | $MoO_3$ | 20 | — | — | M |
| 2 | CoO | 5 | $MoO_3$ | 20 | 3 | — | N |
| 3 | CoO | 5 | $MoO_3$ | 20 | — | 5 | O |
| 4 | CoO | 5 | $MoO_3$ | 8 | 3 | 5 | P |
| 5 | CoO | 5 | $MoO_3$ | 20 | 16 | 5 | Q |
| 6 | CoO | 5 | $MoO_3$ | 20 | 3 | 5 | R |
| 7 | CoO | 5 | $MoO_3$ | 20 | 3 | 5 | S |
| Example 14 | CoO | 5 | $NoO_3$ | 20 | 3 | 5 | A1 |

TABLE 2

| Example No. | Specific Surface Area ($m^2/g$) | Pore Volume (cc/g) | Mean Pore Diameter (Å) | Catalyst |
|---|---|---|---|---|
| Example | | | | |
| 1 | 262 | 0.44 | 82 | A |
| 2 | 271 | 0.43 | 76 | B |
| 3 | 254 | 0.45 | 77 | C |
| 4 | 280 | 0.46 | 75 | D |
| 5 | 243 | 0.41 | 79 | E |
| 6 | 258 | 0.40 | 84 | F |
| 7 | 276 | 0.41 | 76 | G |
| 8 | 309 | 0.39 | 79 | H |
| 9 | 260 | 0.42 | 77 | I |
| 10 | 247 | 0.40 | 75 | J |
| 11 | 283 | 0.45 | 78 | K |
| 12 | 276 | 0.44 | 76 | L |
| Compara. Example | | | | |
| 1 | 284 | 0.56 | 75 | M |
| 2 | 249 | 0.42 | 81 | N |
| 3 | 297 | 0.62 | 76 | O |
| 4 | 281 | 0.46 | 78 | P |
| 5 | 170 | 0.28 | 94 | Q |
| 6 | 211 | 0.45 | 77 | R |
| 7 | 240 | 0.40 | 79 | S |
| Example 14 | 247 | 0.41 | 84 | A1 |

EXAMPLE 13

Each of catalysts A to S prepared in Examples 1 to 12 and Comparative Examples 1 to 4, 6, and 7 and catalyst A1 prepared in Example 14 hereinafter described was used for hydrodesulfurization of gas oil having a specific gravity (15/4° C.) of 0.851, a sulfur content of 1.35%, a nitrogen content of 20 ppm, and a viscosity (30° C.) of 5.499 cSt under the following reaction conditions. Prior to use, each catalyst was activated under the following conditions. Catalyst Q obtained in Comparative Example 5 had poor activity due to a small pore volume and a small specific surface area and was not tested.

Conditions of Hydrodesulfurization:
 Temperature: 340° C.
 Hydrogen pressure: 35 kg/cm$^2$
 LHSV: 1.5 or 4.2 hr$^{-1}$
 Apparatus: Fixed-bed type high pressure flow reactor Conditions of Activation of Catalyst:
 Pressure: 35 kg/cm$^2$
 Atmosphere: Hydrogen sulfide/hydrogen mixed gas flow
 Temperature: Stepwise raised; 100° C.×2 hrs→250° C.×2 hrs→320° C.×2 hrs.

After 100 hours' reaction, the sulfur contents of the feedstock and the product oil were measured, which were substituted into equation (1) shown below to obtain a rate constant. The relative rate constant of each catalyst, assuming the rate constant of catalyst M as a standard (100), is shown as the upper figure in Tables 3 and 4, and the sulfur content (ppm by weight) in the product oil is shown as the lower figure in these Tables (hereinafter the same).

$$k = \frac{LHSV}{n-1} \times [(1/S_P)^{n-1} - (1/S_F)^{n-1}] \quad (1)$$

wherein k: reaction rate constant;

n: reaction order $S_F$: sulfur content in hydrocarbon feedstock $S_P$: sulfur content in product oil

TABLE 3

| Catalyst | LHSV (hr$^{-1}$) 1.5 | 4.2 | Example No. |
|---|---|---|---|
| A | 146 | 120 | 1 |
|   | 219 | 1021 |   |
| B | 132 | 106 | 2 |
|   | 242 | 1150 |   |
| C | 130 | 104 | 3 |
|   | 246 | 1171 |   |
| D | 138 | 114 | 4 |
|   | 232 | 1072 |   |
| E | 140 | 116 | 5 |
|   | 228 | 1054 |   |
| F | 150 | 124 | 6 |
|   | 213 | 989 |   |
| G | 148 | 120 | 7 |
|   | 216 | 1021 |   |
| H | 140 | 114 | 8 |
|   | 228 | 1072 |   |
| I | 130 | 106 | 9 |
|   | 246 | 1150 |   |
| J | 144 | 116 | 10 |
|   | 222 | 1054 |   |
| K | 140 | 110 | 11 |
|   | 228 | 1120 |   |
| L | 152 | 124 | 12 |
|   | 209 | 989 |   |
| A1 | 150 | 121 | 14 |
|   | 213 | 1024 |   |

TABLE 4

| Catalyst | LHSV (hr$^{-1}$) 1.5 | 4.2 | Compara. Example No. |
|---|---|---|---|
| M | 100 | 100 | 1 |
|   | 319 | 1215 |   |
| N | 118 | 104 | 2 |
|   | 271 | 1171 |   |
| O | 117 | 106 | 3 |
|   | 273 | 1150 |   |
| P | 97 | 82 | 4 |
|   | 329 | 1468 |   |
| R | 120 | 112 | 6 |
|   | 266 | 1091 |   |
| S | 116 | 108 | 7 |
|   | 276 | 1132 |   |

EXAMPLE 14

A first impregnating solution was prepared by dissolving 38 g of phosphomolybdic acid [$H_3(PMo_{12}O_{40})\cdot 30H_2O$] and 4 g of phosphoric acid in 75 g of water in an Erlenmeyer flask with stirring at room temperature. The solution was infiltrated into 100 g of an alumina carrier containing 5% of HY type zeolite (specific surface area: 372 m$^2$/g; pore volume: 0.65 cc/g; substantially made of γ-alumina) in an egg-plant type flask at room temperature for 1 hour. The impregnated carrier was air dried and calcined at 500° C. for 4 hours in a muffle furnace.

Separately, 26.9 g of cobalt nitrate was dissolved in 60 g of water with stirring at room temperature in an Erlenmeyer flask to prepare a second impregnating solution. The above obtained catalyst was impregnated with the second impregnating solution at room temperature for 1 hour in an egg-plant type flask, air dried, and calcined at 500° C. for 4 hours in a muffle furnace to obtain catalyst A1.

EXAMPLE 15

Hydrodesulfurization of gas oil was carried out under the same conditions as in Example 13, except for using a γ-alumina catalyst (catalyst B1) having a specific surface area of 372 m$^2$/g, a pore volume of 0.65 cc/g, an HY type zeolite content of 5%, having supported thereon Co, Mo, and P in an amount of 5%, 20% and 3%, respectively, in terms of oxide, and treating gas oil at a temperature of 320° C. or 350° C. at a liquid hourly space velocity of 1.5. The HY type zeolite used had an $SiO_2/Al_2O_3$ molar ratio of 6, an $Na_2O$ content of not more than 0.3%, a specific surface area of 970 m$^2$/g as measured by a Langmuir method or 620 m$^2$/g as measured by a BET method, a crystal size of from 0.7 to 1.0 micron, and a unit cell dimension of 24.45 Å.

EXAMPLE 16

Hydrodesulfurization of gas oil was carried out in the same manner as in Example 15, except that the phosphorus content of the catalyst was 7%. The catalyst used here is designated catalyst C1.

EXAMPLE 17

Hydrodesulfurization of gas oil was carried out in the same manner as in Example 15, except for using a γ-alumina carrier having a specific surface area of 387 m$^2$/g, a pore volume of 0.65 cc/g, and an HY type zeolite content of 10%. The catalyst used here is designated catalyst D1.

EXAMPLE 18

Hydrodesulfurization of gas oil was carried out in the same manner as in Example 15, except for using a γ-alumina carrier having a specific surface area of 403 m²/g, a pore volume of 0.65 cc/g, and an HY type zeolite content of 20%. The catalyst used here is designated catalyst E1.

EXAMPLE 19

Hydrodesulfurization of gas oil was carried out in the same manner as in Example 15, except that the carrier had a specific surface area of 386 m²/g and a pore volume of 0.67 cc/g and consisted of an HY type zeolite which had an $SiO_2/Al_2O_3$ molar ratio of 5.5, an $Na_2O$ content of not more than 0.3%, a specific surface area of 730 m²/g as measured by a Langmuir method or 530 m²/g as measured by a BET method, a crystal size of from 0.6 to 0.9 micron, and a unit cell dimension of 24.55 Å. The catalyst used here is designated catalyst F1.

COMPARATIVE EXAMPLE 9

Hydrodesulfurization of gas oil was carried out in the same manner as in Example 15, except that the catalyst used here (designated catalyst G1) comprised a carrier solely consisting of γ-alumina having a specific surface area of 336 m²/g and a pore volume of 0.71 cc/g and having supported thereon no phosphorus component.

COMPARATIVE EXAMPLE 10

Hydrodesulfurization of gas oil was carried out in the same manner as in Comparative Example 9, except that the catalyst further contained 3% of phosphorus. The catalyst used here is designated catalyst H1.

COMPARATIVE EXAMPLE 11

Hydrodesulfurization of gas oil was carried out in the same manner as in Example 15, except that the catalyst used (designated catalyst I1) had supported thereon no phosphorus component.

COMPARATIVE EXAMPLE 12

Hydrodesulfurization of gas oil was carried out in the same manner as in Example 15, except that the carrier used in the catalyst had a specific surface area of 374 m²/g and a pore volume of 0.69 cc/g and consisted of a zeolite having an $SiO_2/Al_2O_3$ molar ratio of 10, an $Na_2O$ content of not more than 0.3%, a specific surface area of 950 m²/g as measured by a Langmuir method or 610 m²/g as measured by a BET method, a crystal size of 0.6 to 0.9 micron, and a unit cell dimension of 24.38 Å. The catalyst used here is designated catalyst J1.

COMPARATIVE EXAMPLE 13

Hydrodesulfurization of gas oil was carried out in the same manner as in Example 15, except that the catalyst used (designated catalyst K1) was different from that used in Example 1 only in mean pore diameter.

COMPARATIVE EXAMPLE 14

Hydrodesulfurization of gas oil was carried out in the same manner as in Example 15, except that the catalyst used here (designated catalyst L1) was different from that used in Example 1 only in pore size distribution.

The composition and physical properties of catalysts B1 to L1 obtained in Examples 15 to 19 and Comparative Examples 9 to 14 are tabulated in Table 5 below.

Each of catalysts B1 to L1 was evaluated in the same manner as in Example 13, except that the reaction conditions were changed as shown in Table 6 below. The results obtained are also shown in Table 6. In the Table, the upper figures are relative activity values assuming the rate constant of catalyst G1 of Comparative Example 9 as a standard (100), and the lower figures are sulfur contents (ppm by weight) in the product oils.

TABLE 5

| Example No. | Catalyst | Composition CoO (%) | MoO₃ (%) | P₂O₅ (%) | Zeolite (%) | Unit Cell Dimension (Å) | Mean Pore Diameter (Å) | Pore Size Distribution (%) | Specific Surface Area (m²/g) | Pore Volume (cc/g) |
|---|---|---|---|---|---|---|---|---|---|---|
| Example | | | | | | | | | | |
| 15 | B1 | 5 | 20 | 3 | 5 | 24.50 | 78 | 84 | 267 | 0.45 |
| 16 | C1 | 5 | 20 | 7 | 5 | 24.50 | 70 | 88 | 232 | 0.37 |
| 17 | D1 | 5 | 20 | 3 | 10 | 24.50 | 76 | 86 | 276 | 0.41 |
| 18 | E1 | 5 | 20 | 3 | 20 | 24.50 | 79 | 71 | 309 | 0.39 |
| 19 | F1 | 5 | 20 | 3 | 5 | 24.55 | 77 | 83 | 263 | 0.43 |
| Compara. Example | | | | | | | | | | |
| 9 | G1 | 5 | 20 | — | — | — | 75 | 79 | 284 | 0.56 |
| 10 | H1 | 5 | 20 | 3 | — | — | 74 | 72 | 237 | 0.46 |
| 11 | I1 | 5 | 20 | — | 5 | 24.50 | 79 | 75 | 315 | 0.57 |
| 12 | J1 | 5 | 20 | 3 | 5 | 24.38 | 76 | 87 | 271 | 0.43 |
| 13 | K1 | 5 | 20 | 3 | 5 | 24.50 | 84 | 79 | 249 | 0.44 |
| 14 | L1 | 5 | 20 | 3 | 5 | 24.50 | 77 | 53 | 270 | 0.46 |

TABLE 6

| | Reaction Conditions | | | |
|---|---|---|---|---|
| Catalyst | 320° C., LHSV: 1.5 hr⁻¹ | 340° C., LHSV: 4.2 hr⁻¹ | 350° C. LHSV: 1.5 hr⁻¹ | Example No. |
| | | | | Example |
| B1 | 136 | 123 | 153 | 15 |
| | 370 | 900 | 140 | |

TABLE 6-continued

| Catalyst | Reaction Conditions | | | Example No. |
|---|---|---|---|---|
| | 320° C., LHSV: 1.5 hr$^{-1}$ | 340° C., LHSV: 4.2 hr$^{-1}$ | 350° C. LHSV: 1.5 hr$^{-1}$ | |
| C1 | 121 | 114 | 142 | 16 |
| | 450 | 1000 | 160 | |
| D1 | 121 | 115 | 146 | 17 |
| | 450 | 1000 | 150 | |
| E1 | 132 | 116 | 147 | 18 |
| | 380 | 930 | 150 | |
| F1 | 132 | 116 | 147 | 19 |
| | 380 | 930 | 150 | |
| G1 | 100 | 100 | 100 | Compara. Example 9 |
| | 610 | 1220 | 310 | |
| H1 | 102 | 110 | 115 | 10 |
| | 540 | 1140 | 230 | |
| I1 | 106 | 97 | 119 | 11 |
| | 560 | 1270 | 220 | |
| J1 | 113 | 120 | 124 | 12 |
| | 520 | 910 | 210 | |
| K1 | 111 | 123 | 102 | 13 |
| | 520 | 900 | 290 | |
| L1 | 108 | 117 | 114 | 14 |
| | 530 | 920 | 240 | |

The product oils obtained in Example 15 and Comparative Example 9 were analyzed with a Gas Chromatograph equipped with an Atomic Emission Detector, and the residual sulfur contents were determined. The results obtained are shown in Table 7.

TABLE 7

| | Sulfur Content (ppm by wt.) | | |
|---|---|---|---|
| | DBT | 4M-DBT | 4,6DM-DBT |
| Feedstock | 464 | 221 | 253 |
| Product Oil: | | | |
| 340° C., LHSV = 4.2 hr$^{-1}$: | | | |
| Example 15 | 41 | 75 | 107 |
| Comparative Example 9 | 44 | 104 | 204 |
| 350° C., LHSV = 1.5 hr$^{-1}$: | | | |
| Example 15 | 11 | 11 | 17 |
| Comparative Example 9 | 10 | 29 | 41 |

As described and demonstrated above, since the catalyst used in the present invention contains both phosphorus and zeolite to a large extent, it exhibits very high desulfurization activity and is sufficiently effective on removal of such intractable substances as 4M-DBT and 4,6DM-DBT that have caused problems in the production of gas oil having a sulfur content of not more than 0.05% by weight. Thus, the present invention makes it possible to produce gas oil having an extremely reduced sulfur content.

While the invention has been described in detail and with reference to specific examples thereof, it will be apparent to one skilled in the art that various changes and modifications can be made therein without departing from the spirit and scope thereof.

What is claimed is:

1. A process for hydrodesulfurizing gas oil feed stock having a boiling point ranging from 150 to 400° C. and which contains some residual sulfur at a sulfur content of not more than 3% by weight to obtain a gas oil product, wherein the gas oil is a feed stock selected from the group consisting of gas oil obtained by catalytic cracking, gas oil obtained by thermal cracking, straight-run gas oil, coker gas oil, gas oil which has been subjected to a hydrogenation treatment, and gas oil which has been subjected to a desulfurization treatment, which process comprises bringing said gas oil feed stock into contact with a catalyst obtained by impregnating an inorganic oxide carrier containing a crystalline aluminosilicate having a unit cell dimension between 24.45 Å and 24.55 Å with an impregnating solution consisting essentially of a polyacid salt of a metal belonging to Group VI of the Periodic Table, a salt of a metal belonging to Group VIII of the Periodic Table and phosphoric acid which have been dissolved in a solvent to form the impregnating solution, to thereby provide a Group VI metal content of from 10% to 30% by weight, a Group VIII metal content of from 1 to 15% by weight, and a phosphorus content of from 0.1 to 15% by weight, each in terms of oxide with respect to the total catalyst, drying the impregnated inorganic oxide carrier, and calcining the dried inorganic carrier, wherein the catalyst has a mean pore diameter of form 70 to 80 Å with a pore size distribution of not less than 70%, expressed as a proportion of pores having a pore size of the mean diameter ±15 Å, at a temperature of from 320 to 380° C., under a pressure of from 30 to 80 kg/cm$^3$, a liquid hourly space velocity of from 1.0 to 5.0 hr$^{-1}$ and at a hydrogen/oil ratio of from 100 to 400 l/l, wherein said gas oil feed stock contains the untractable substances 4-methyldibenzothiophene and 4,6-dimethyldibenzothiphene which are removed from the gas oil feed stock during the process for hydrodesulfurizing the gas oil feed stock to obtain the gas oil product, wherein the residual sulfur content in the gas oil feed stock is reduced to a value in the range of from 0.001 to 0.05% by weight in the gas oil product.

2. A process according to claim 1 wherein said mean pore diameter is from 73 to 77 Å and said pore size distribution is not less than 80%.

3. A process according to claim 1, wherein the carrier consists of 80 to 99% by weight of the inorganic oxide and 1 to 20% by weight of the crystalline aluminosilicate, the calcining is at 200 to 800° C. for from 2 to 10 hours, and the residual sulfur content is reduced to a value in the range of from 0.01 to 0.03% by weight.

4. A process according to claim 1, wherein the catalyst contains from 1 to 20% by weight crystalline aluminosilicate.

5. A process according to claim 1, wherein the catalyst contains from 15 to 25 wt % of the Group VI metal, in terms of oxide, with respect to the total catalyst.

6. A process according to claim 1, wherein the catalyst contains from 18 to 25 wt % of the Group VI metal, in terms of oxide, with respect to the total catalyst.

7. A process according to claim 1, wherein the catalyst contains from 2 to 15% by weight crystalline aluminosilicate.

8. A process according to claim 1, wherein the catalyst has a specific surface area of not less than 200 m$^2$/g.

9. A process according to claim 1, wherein the catalyst has a pore volume of between 0.3 cc/g and 1.2 cc/g.

10. A process according to claim 1, wherein the inorganic oxide carrier is γ-alumina, the crystalline aluminosilicate is HY-type zeolite, the polyacid salt of a metal belonging to Group VI is phosphomolybdic acid or phosphotungstic acid, the salt of a metal belonging to Group VIII is a carbonate or acetate of cobalt or nickel, and the phosphoric acid is orthophosphoric acid.

11. A process according to claim 1, wherein the impregnating is a one-step impregnating at a temperature of 15 to 30° C. for a time of from 30 minutes to 1 hour.

12. A process according to claim 1, wherein the hydrogen/oil ratio is 200 to 300 l/l.

13. A process for hydrodesulfurizing a gas oil feed stock having a boiling point ranging from 150 to 400° C. and which contains some residual sulfur at a sulfur content of not more than 3% by weight to obtain a gas oil product, wherein the gas oil is a feed stock selected from the group consisting of gas oil obtained by catalytic cracking, gas oil obtained by thermal cracking, straight-run gas oil, coker gas oil, gas oil which has been subjected to a hydrogenation treatment, and gas oil which has been subjected to a desulfurization treatment, which process comprises bringing said gas oil feed stock into contact with a catalyst obtained by impregnating an inorganic oxide carrier containing a crystalline aluminosilicate having a unit cell dimension between 24.45 Å and 24.55 Å with an impregnating solution consisting essentially of a polyacid salt of a metal belonging to Group VI of the Periodic Table, a salt of a metal belonging to Group VIII of the Periodic Table, and phosphoric acid which have been dissolved in a solvent to form the impregnating solution, to thereby provide a Group VI metal content of from 10 to 30% by weight, a Group VIII metal content of from 1 to 15% by weight, and a phosphorus content of from 0.1 to 15% by weight, each in terms of oxide with respect to the total catalyst, drying the impregnated inorganic oxide carrier, and calcining the dried inorganic oxide carrier, wherein the catalyst has a mean pore diameter of from 70 to 80 Å with a pore size distribution of not less than 70%, expressed as a proportion of pores having a pore size of the mean diameter ±15 Å, at a temperature of from 320 to 380° C., under a pressure of from 30 to 80 kg/cm$^3$, and a liquid hourly space velocity of from 1.0 to 5.0 hr$^{-1}$, wherein said gas oil feed stock contains the untractable substances 4-methyldibenzothiophene and 4,6-dimethyl dibenzothiophene which are removed from the gas oil feed stock during the process for hydrodesulfurizing the gas oil feed stock to obtain the gas oil product wherein the residual sulfur content in the gas oil feed stock is reduced to a value in the range of from 0.001 to 0.05% by weight in the gas oil product.

14. A process according to claim 13 wherein said mean pore diameter is from 73 to 77 Å and said pore size distribution is not less than 80%.

15. A process according to claim 13, wherein the carrier consists of 80 to 99% by weight of the inorganic oxide and 1 to 20% by weight of the crystalline aluminosilicate, the calcining is at 200 to 800° C. for from 2 to 10 hours.

16. A process according to claim 13, wherein the catalyst contains from 1 to 20% by weight crystalline aluminosilicate.

17. A process according to claim 13, wherein the catalyst contains from 15 to 25 wt % the of Group VI metal, in terms of oxide, with respect to the total catalyst.

18. A process according to claim 13, wherein the catalyst contains from 18 to 25 wt % of Group VI metal, in terms of oxide, with respect to the total catalyst.

19. A process according to claim 13, wherein the catalyst contains from 2 to 15% by weight crystalline aluminosilicate.

20. A process according to claim 13, wherein the catalyst has a specific surface area of not less than 200 m$^2$/g.

21. A process according to claim 13, wherein the catalyst has a pore volume of between 0.3 cc/g and 1.2 cc/g.

22. A process according to claim 13, wherein the inorganic oxide carrier is γ-alumina, the crystalline aluminosilicate is HY-type zeolite, the polyacid salt of a metal belonging to Group VI is phosphomolybdic acid or phosphotungstic acid, the salt of a metal belonging to Group VIII is a carbonate or acetate of cobalt or nickel, and the phosphoric acid is orthophosphoric acid.

23. A process according to claim 13, wherein the impregnating is a one-step impregnating at a temperature of 15 to 30° C. for a time of from 30 minutes to 1 hour.

24. A process according to claim 13, wherein the process is conducted at a hydrogen/oil ratio of from 200 to 300 l/l.

* * * * *

UNITED STATES PATENT AND TRADEMARK OFFICE
CERTIFICATE OF CORRECTION

PATENT NO. : 6,063,265
DATED : May 16, 2000
INVENTOR(S) : Osamu Chiyoda, Kazushi Usui, Mitsugu Yumoto, Kazuo Idei, Etsuo Suzuki, Katsuyoshi Ohki, Takashi Fujikawa, Hatsutaro Yamazaki, and Shunji Kitada.

It is certified that error appears in the above-identified patent and that said Letters Patent is hereby corrected as shown below:

Title page,
Before item [51] Int. Cl., please insert:

-- [30] Foreign Application Priority Data:
December 30, 1993 [JP] Japan 5-352636
December 30, 1993 [JP] Japan 5-352639
December 30, 1993 [JP] Japan 5-352637 --.

Signed and Sealed this

Thirtieth Day of October, 2001

Attest:

*Nicholas P. Godici*

NICHOLAS P. GODICI
*Attesting Officer*   *Acting Director of the United States Patent and Trademark Office*